United States Patent
Dong et al.

(10) Patent No.: US 10,092,838 B2
(45) Date of Patent: Oct. 9, 2018

(54) ELECTRONIC APPARATUS FOR CONTROLLING A MULTI-FIELD-OF-VIEW DISPLAY APPARATUS, ELECTRONIC SYSTEM AND CONTROL METHOD

(71) Applicant: BOE Technology Group Co., Ltd., Beijing (CN)

(72) Inventors: Yefei Dong, Beijing (CN); Li Yang, Beijing (CN); Wenbo Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 153 days.

(21) Appl. No.: 14/653,142

(22) PCT Filed: Oct. 27, 2014

(86) PCT No.: PCT/CN2014/089590
§ 371 (c)(1),
(2) Date: Jun. 17, 2015

(87) PCT Pub. No.: WO2016/015393
PCT Pub. Date: Feb. 4, 2016

(65) Prior Publication Data
US 2016/0250552 A1 Sep. 1, 2016

(30) Foreign Application Priority Data

Jul. 29, 2014 (CN) .......................... 2014 1 0366555

(51) Int. Cl.
*A63F 9/24* (2006.01)
*A63F 13/52* (2014.01)
(Continued)

(52) U.S. Cl.
CPC .............. *A63F 13/52* (2014.09); *A63F 13/21* (2014.09); *A63F 13/843* (2014.09); *H04N 13/0447* (2013.01)

(58) Field of Classification Search
CPC .......... A63F 13/25; A63F 13/52; A63F 13/843
See application file for complete search history.

(56) References Cited

U.S. PATENT DOCUMENTS

2005/0111100 A1* 5/2005 Mather ................. G02F 1/1323
359/464
2009/0093303 A1* 4/2009 Neal .................... G07F 17/3211
463/31
(Continued)

FOREIGN PATENT DOCUMENTS

CN 101472108 A 7/2009
CN 101966393 A 2/2011
(Continued)

OTHER PUBLICATIONS

Mar. 30, 2015—International Search Report and Written Opinion for Appn PCT/CN2014/089590 with Eng Tran.
(Continued)

*Primary Examiner* — Steve Rowland
(74) *Attorney, Agent, or Firm* — Banner & Witcoff, Ltd.

(57) ABSTRACT

Provided are an electronic apparatus, an electronic system and a control method thereof. The electronic apparatus is used for controlling a multi-field-of-view display apparatus, wherein the multi-field-of-view display apparatus has multiple view areas each of which covers the entire display area of the multi-field-of-view display apparatus and displays one picture respectively, and the electronic apparatus controls the multi-field-of-view display apparatus such that at least two pictures among the pictures simultaneously displayed in the view areas are based on different angles of view. The electronic apparatus is applicable to multi-person games, and enables multiple players to view pictures with different game scenes through the same screen, and would not reduce visual experience due to reduction of screen area that needs to be viewed by each player.

18 Claims, 4 Drawing Sheets

(51) Int. Cl.
*A63F 13/21* (2014.01)
*A63F 13/843* (2014.01)
*H04N 13/04* (2006.01)

(56) References Cited

U.S. PATENT DOCUMENTS

| | | | |
|---|---|---|---|
| 2010/0002079 A1* | 1/2010 | Krijn | G02B 27/0093 348/148 |
| 2011/0227938 A1 | 9/2011 | Lan et al. | |
| 2011/0246908 A1 | 10/2011 | Akram et al. | |
| 2011/0267439 A1* | 11/2011 | Chen | G02B 27/2264 348/53 |
| 2011/0285968 A1* | 11/2011 | Huang | G03B 35/24 353/31 |
| 2012/0026157 A1* | 2/2012 | Unkel | G09G 3/003 345/419 |
| 2012/0028701 A1* | 2/2012 | Gomez | G07F 17/3211 463/25 |
| 2012/0120065 A1 | 5/2012 | Kim et al. | |
| 2012/0212589 A1 | 8/2012 | Chien | |
| 2013/0093956 A1* | 4/2013 | Macleod | H04N 13/0438 348/588 |
| 2013/0169763 A1 | 7/2013 | Choi et al. | |
| 2014/0247330 A1* | 9/2014 | Baik | H04N 5/23219 348/51 |
| 2014/0327694 A1* | 11/2014 | Cao | H04N 13/0422 345/597 |

FOREIGN PATENT DOCUMENTS

| | | |
|---|---|---|
| CN | 102014292 A | 4/2011 |
| CN | 102647603 A | 8/2012 |
| CN | 102999692 A | 3/2013 |
| CN | 103188569 A | 7/2013 |
| EP | 2391134 A1 | 11/2011 |
| JP | 2013059574 A | 4/2013 |

OTHER PUBLICATIONS

Jul. 14, 2016—(CN)—First Office Action Appn 201410366555.8 with English Tran.
Mar. 31, 2017—(CN) Second Office Action Appn 201410366555.8 with English Tran.

\* cited by examiner

ELECTRONIC APPARATUS FOR CONTROLLING A MULTI-FIELD-OF-VIEW DISPLAY APPARATUS, ELECTRONIC SYSTEM AND CONTROL METHOD

The application is a U.S. National Phase Entry of International Application No. PCT/CN2014/089590 filed on Oct. 27, 2014, designating the United States of America and claiming priority to Chinese Patent Application No. 201410366555.8 filed on Jul. 29, 2014. The present application claims priority to and the benefit of the above-identified applications and the above-identified applications are incorporated by reference herein in their entirety.

TECHNICAL FIELD OF THE DISCLOSURE

The present disclosure relates to an electronic apparatus, an electronic system and a control method.

BACKGROUND

With the development trend of real simulation and networking for games, the angle of view (AOV) issue in game design becomes a bottleneck in game development. In two-person games, there is a two-people in one screen mode using a third person AOV (top-down view), or the screen is split into upper and lower parts or left and right parts for display with the same AOV (for example, a first person AOV). In such a networking game as the new Super Mario Bros. II, the main AOV is determined by one avatar (the main character) in the game, and other avatars can only remain within a certain range relative to the main character under the main AOV. If they are out of the range, the system will draw the other avatars to a place near the main character. When the main AOV operates too fast such that other avatars are drawn out of the screen, the system will automatically draw the other avatars to a place near the main character. The avatar that first goes into the next level can snatch the main AOV, and the system can automatically take this avatar as the main character and switches the main AOV. Currently, a game device usually can only display game pictures on a single screen. If a two-person game is needed, the two players can only play in the same game scene. Because using the same game picture limits the game scenes, the realizable game types are few. For example, it is not possible to realize the simultaneous presentation of the first person AOV (for example, the AOV from left to right) game and the second person AOV (for example, the AOV from left to right) game; for a two-person game with different scenes, it is necessary to split one screen into two screens to display pictures with different scenes, which however reduces the screen area that needs to be viewed by each player and thus reduces visual experience.

SUMMARY

At least one embodiment of the present disclosure provides an electronic apparatus, an electronic system and a control method, which enable multiple players to view pictures with different game scenes through the same screen, and would not reduce visual experience due to reduction of the screen area that needs to be viewed by each player.

According to one aspect of the present disclosure, there is provided an electronic apparatus for controlling a multi-field-of-view (multi-FOV) display apparatus, wherein the multi-field-of-view display apparatus has multiple view areas each of which covers the entire display area of the multi-field-of-view display apparatus and displays one picture respectively, and the electronic apparatus controls the multi-field-of-view display apparatus such that at least two pictures among the pictures simultaneously displayed in the view areas are based on different angles of view (AOVs).

Further, the different AOVs are AOVs of different avatars in a game.

Further, the pictures simultaneously displayed in the view areas are switched between pictures with the same AOV and pictures with different AOVs according to display needs of content.

Further, being switched between pictures with the same AOV and pictures with different AOVs according to display needs of content comprises: being switched between the pictures with the same AOV and the pictures with different AOVs according to a trigger signal.

Further, the trigger signal comprises a level signal, a distance signal, a space signal or a force signal.

Further, the electronic apparatus comprises a game processing unit and multiple video processing units, and the game processing unit comprising a switching module for performing switching between the pictures with the same AOV and the pictures with different AOVs;

the game processing unit is also configured to receive multiple control signals and generate multiple game scene data according to the multiple control signals;

the multiple video processing units are connected to the game processing unit, and the multiple video processing units are configured to receive the multiple game scene data respectively and generate respective multiple video signals according to the multiple game scene data; and the multiple video processing units are configured to transmit the multiple video signals to the multi-field-of-view display apparatus for the multi-field-of-view display apparatus to display respective pictures in the multiple view areas respectively according to the multiple video signals.

Further, the control signal comprises a trigger signal.

Further, the electronic apparatus further comprises multiple game controllers for respectively generating multiple control signals to be transmitted to the game processing unit.

Further, the electronic apparatus further comprises:

multiple audio processing units connected to the game processing unit, wherein the multiple audio processing units are configured to respectively receive the multiple game scene data and generate respective multiple audio signals according to the multiple game scene data; and multiple audio output apparatuses respectively connected to the multiple audio processing units, wherein the multiple audio output apparatuses are configured to respectively receive the multiple audio signals and output respective sounds according to the multiple audio signals.

Further, the multi-field-of-view display apparatus is a double-field-of-view display apparatus which has a first view area and a second view area for displaying different pictures;

the multiple game controllers comprise a first game controller for generating a first control signal and a second game controller for generating a second control signal;

the game processing unit is connected to the first game controller and the second game controller, the game processing unit is configured to receive the first control signal and the second control signal and generate a first game scene data and a second game scene data according to the first control signal and the second control signal;

the multiple video processing units comprise a first video processing unit and a second video processing unit connected to the game processing unit;

the first video processing unit is configured to receive the first game scene data and generate a first video signal according to the first game scene data;

the second video processing unit is configured to receive the second game scene data and generate a second video signal according to the second game scene data;

the first video processing unit and the second video processing unit are also configured to transmit the first video signal and the second video signal to the double-field-of-view apparatus for the double-field-of-view apparatus to display a first game picture in the first view area according to the first video signal and to display a second game picture in the second view area according to the second video signal.

Further, the above electronic apparatus further comprises a first audio processing unit and a second audio processing unit connected to the game processing unit, and a first audio output apparatus connected to the first audio processing unit and a second audio output apparatus connected to the second audio processing unit;

the first audio processing unit is configured to receive the first game scene data and generate a first audio signal according to the first game scene data;

the second audio processing unit is configured to receive the second game scene data and generate a second audio signal according to the second game scene data;

the first audio output apparatus is configured to receive the first audio signal and output a first sound according to the first audio signal; and the second audio output apparatus is configured to receive the second audio signal and output a second sound according to the second audio signal.

According to another aspect of the present disclosure, there is provided an electronic system comprising a multi-field-of-view display apparatus and an electronic apparatus as described in the above, wherein the electronic apparatus is connected to the multi-field-of-view display apparatus.

Further, the electronic apparatus and the multi-field-of-view display apparatus are integrated together.

According to yet another aspect of the present disclosure, there is provided a control method for controlling a multi-field-of-view display apparatus, wherein the multi-field-of-view display apparatus has multiple view areas each of which covers the entire display area of the multi-field-of-view display apparatus and displays one picture respectively, and the control method comprises:

making at least two pictures among the pictures simultaneously displayed in the view areas be based on different angles of view (AOVs).

Further, the different AOVs are AOVs of different avatars in a game.

Further, the pictures simultaneously displayed in the view areas are switched between pictures with the same AOV and pictures with different AOVs according to display needs of content.

Further, the control method comprises:

generating multiple control signals;

receiving the multiple control signals and generating multiple game scene data according to the multiple control signals, wherein the multiple game scene data comprises data for performing switching between the pictures with the same AOV and the pictures with different AOVs;

receiving the multiple game scene data and generating respective multiple video signals according to the multiple game scene data; and transmitting the multiple video signals to the multi-field-of-view display apparatus for the multi-field-of-view display apparatus to display respective pictures in the multiple view areas respectively according to the multiple video signals.

Further, the multi-field-of-view display apparatus is a double-field-of-view display apparatus which has a first view area and a second view area for displaying different pictures;

the generating multiple control signals is generating a first control signal and generating a second control signal;

a procedure for receiving the multiple control signals and generating multiple game scene data according to the multiple control signals is:

receiving the first control signal and the second control signal and generating a first game scene data and a second game scene data according to the first control signal and the second control signal;

a procedure for receiving the multiple game scene data and generating respective multiple video signals according to the multiple game scene data is:

receiving the first game scene data and generating a first video signal according to the first game scene data, and receiving the second game scene data and generating a second video signal according to the second game scene data; and a procedure for transmitting the multiple video signals to the multi-field-of-view display apparatus for the multi-field-of-view display apparatus to display respective pictures in the multiple view areas respectively according to the multiple video signals is: transmitting the first video signal and the second video signal to the double-field-of-view apparatus for the double-field-of-view apparatus to display a first game picture in the first view area according to the first video signal and for the double-field-of-view apparatus to display a second game picture in the second view area according to the second video signal.

BRIEF DESCRIPTION OF THE DRAWINGS

In order to describe technical solutions of embodiments of the present disclosure more clearly, figures that need to be used in the description of the embodiments are briefly introduced in the following. Obviously, the figures in the following description only describe some embodiments of the present disclosure. Those skilled in the art can obtain other figures based on these figures without creative work.

DETAILED DESCRIPTION

Figure 1:
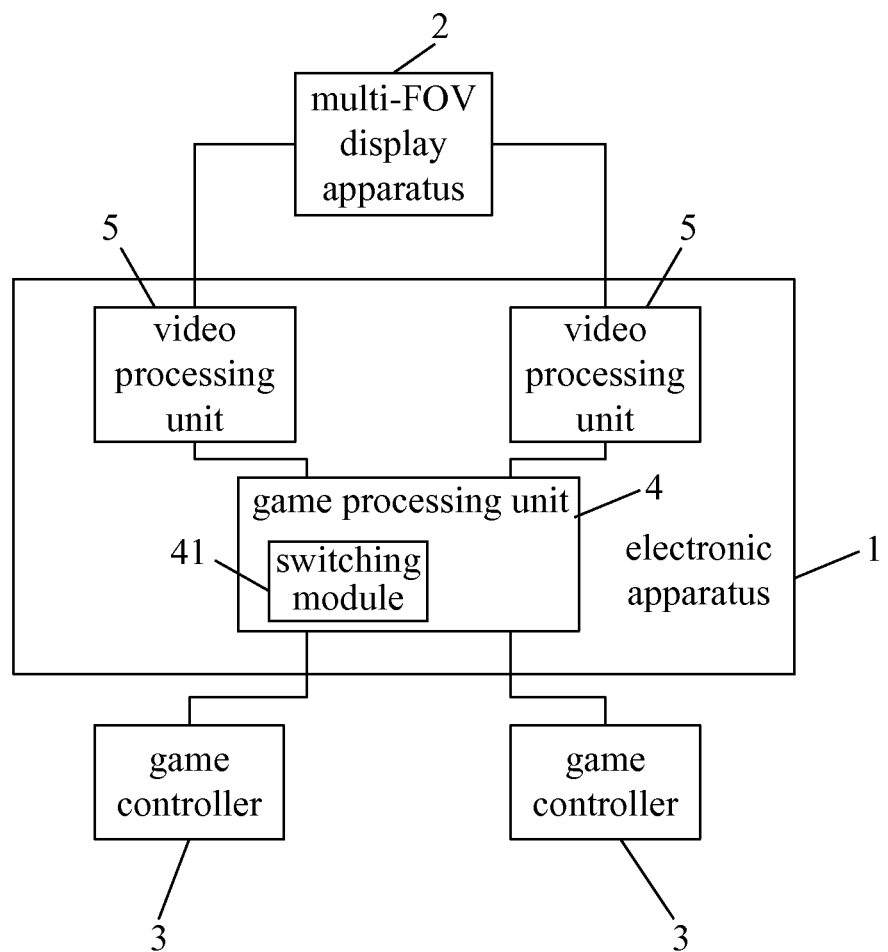
FIG. 1 is a block diagram of a structure of an electronic system in an embodiment of the present disclosure.

In the following, clear and complete description will be made on the technical solutions in embodiments of the present disclosure in connection with the figures in the embodiments of the present disclosure. Obviously, the described embodiments are only part of but not all embodiments of the present disclosure. All other embodiments obtained by those skilled in the art based on the embodiments in the present disclosure without creative work fall within the protection scope of the present disclosure.

An embodiment of the present disclosure provides an electronic apparatus for controlling a multi-field-of-view (multi-FOV) display apparatus, wherein the multi-FOV display apparatus has multiple view areas each of which covers the entire display area of the multi-field-of-view display apparatus and displays one picture respectively, and the electronic apparatus controls the multi-FOV display apparatus such that at least two pictures among the pictures simultaneously displayed in the view areas are based on different AOVs. Each view area of the above multi-FOV display apparatus displays one corresponding picture. At the same timing, those pictures may be based on the same AOV or may be based on different AOVs, as long as at least two pictures are based on different AOVs at a certain timing.

Further, each view area of the above multi-FOV display apparatus displays one corresponding picture, and the AOVs of the pictures are AOVs of different avatars in the game, or can be an AOV of a set third person.

Further, the pictures simultaneously displayed in the view areas are switched between pictures with the same AOV and pictures with different AOVs according to display needs of content.

Further, the switching between the pictures with the same AOV and the pictures with different AOVs is performed according to display needs of content, for example, according to a trigger signal such as a level signal, a distance signal, a space signal or a force signal. Taking the distance signal as an example, when different avatars in the game are very close in distance, the AOV can be switched into the AOV of a third person to display the main character avatar and other avatars simultaneously. Such multi-person display mode makes multiple players see the same picture. When the distance between different avatars in the game is beyond a certain distance, the AOV of the picture displayed in one view area is a first person AOV or a second person AOV of a avatar of a main character, and the AOV of the picture displayed in another view area is a first person AOV or a second person AOV of a avatar of a secondary character.

Similarly, the level signal or the space signal can also be the trigger signal. The force signal can also be the trigger signal. When one of the multiple players does not want to play in the picture with its own AOV, he can click a specific button or use a specific equipment to trigger to force into the picture with the same AOV, that is, switch into a picture with a third person AOV to display the main character avatar and other avatars simultaneously. On the contrary, if he does not want to play in the picture with the same AOV, he can also click a specific button or use a specific equipment to trigger to force into the picture with different AOVs.

In the following, description will be made by taking a two-person car racing game as an example. At the first phase, the main character avatar and other avatars are in the same track. If their distance is within a certain range, the AOV can be switched into a third person AOV to simultaneously display the main character avatar and the other avatars. Such multi-person display mode makes multiple players see the same picture no matter they are the main character or secondary characters. If their distance is beyond a certain range, the display is performed with a near multi-person mode, that is, the picture based on a first person AOV or a second person AOV of the main character avatar is displayed in the view area seen by the first player, and the picture based on a first person AOV or a second person AOV of another avatar (secondary character) is displayed in the view area seen by the second player. In other words, in this case, the main character avatar and the secondary character avatar are the "main characters" in the pictures displayed in the two view areas respectively.

In the single-person display mode at the second phase, the AOVs of the two view areas are independent of each other, that is, the AOV of the picture displayed in one view area is a first person or second person AOV of the main character avatar, and the AOV of the picture displayed in the other view area is a first person or second person AOV of the secondary character avatar.

Of course, in another embodiment, no matter whether the distance between the main character avatar and the secondary character avatar is beyond the range, the main character avatar and the secondary character avatar are taken as the "main characters" in the pictures displayed in the two view areas respectively in the whole process of the game, that is, the AOVs of the two view areas are independent of each other. For example, in the whole process of the game, the picture displayed in the left view area of the display apparatus is based on a first person or second person AOV of the avatar controlled by the player on the left, and the picture displayed in the right view area of the display apparatus is based on a first person or second person AOV of the avatar controlled by the player on the right.

Because there are various AOVs in the development of the game, the above first person AOV, second person AOV and third person AOV can also be replaced by other AOVs as long as the AOVs of the pictures displayed in the two view areas in the single-person display mode are independent of each other and the AOVs of the pictures displayed in the two view areas in the multi-person display mode are the same (they can also be independent AOVs if needed).

In the following, further description is made in connection with FIG. 1. FIG. 1 is a block diagram of a structure of an electronic system in an embodiment of the present disclosure. As shown in FIG. 1, an embodiment of the present disclosure provides an electronic apparatus 1 for a multi-FOV display apparatus 2. The electronic apparatus 1 and the multi-FOV display apparatus 2 can constitute an electronic system. The multi-FOV display apparatus 2 comprises a display unit and a slit grating (or another prism or lens unit) located on the light outputting side of the display unit. Depending on different angles of viewing, the multi-FOV display apparatus 2 has multiple view areas, and the slit grating or another prism or lens unit can make different pixels of the display unit display and image in different view areas, that is, the multiple view areas are used to display different pictures without reducing the size of the picture displayed in each view area.

The electronic apparatus 1 comprises a game processing unit 4 and multiple video processing units 5. The game processing unit 4 comprises a switching module 41 for performing switching between the pictures with the same AOV and the pictures with different AOVs. For example, the switching module 41 is configured to switch the pictures simultaneously displayed in the multiple view areas of the multi-FOV display apparatus between the pictures with the same AOV and the pictures with different AOVs according to display needs of content. The game processing unit 4 is also configured to receive multiple control signals and generate multiple game scene data according to the multiple control signals. The game processing unit 4 is connected to the multiple video processing units 5, and the multiple video processing units 5 are configured to receive the multiple game scene data respectively and generate respective multiple video signals according to the multiple game scene data. In the electronic system, the multiple video processing units 5 are connected to the multi-FOV display apparatus 2, and the multiple video processing units 5 are configured to transmit the multiple video signals to the multi-FOV display apparatus 2 for the multi-FOV display apparatus 2 to display respective pictures in the multiple view areas respectively according to the multiple video signals.

The switching module 41 is configured to switch the pictures simultaneously displayed in the multiple view areas of the multi-FOV display apparatus between the pictures with the same AOV and the pictures with different AOVs according to display needs of content. For example, the switching may be performed according to a trigger signal. Further, the control signal received by the above game processing unit 4 also comprises a trigger signal. The switching module 41 switches the pictures simultaneously displayed in the multiple view areas of the multi-FOV display apparatus 2 between the pictures with the same AOV and the pictures with different AOVs according to the trigger signal.

The game processing unit 4 is used to create game scenes and generate corresponding game scene data. The creating of the game scenes comprises invoking or creating of images, texts or sound materials. The game scene comprises current background, spectacle or the like of the game. The game scene can be output through for example pictures, sounds, vibration feedbacks or the like for the players to experience. Since the game scene can be changed due to the control of the players, the game scene data is generated according to a control signal. In addition, in multi-person games, since the control of one player may not only change his own game scene but also change other players' corresponding game scenes, the game scene data of a certain player is generated by multiple control signals. The video processing unit 5 is configured to generate data (i.e., video signal) corresponding to respective game scene pictures according to the game scene data such that the display apparatus can display corresponding game scene pictures directly through the video signal.

Exemplarily, the electronic apparatus in an embodiment of the present disclosure can also comprise multiple game controllers 3 for generating control signals respectively according to operations of different players. The game controller for example can be a joystick, a keyboard, a mouse, a touch screen, a body-sensing controller or the like. The multiple game controllers 3 are used to generate multiple control signals respectively to be transmitted to the game processing unit 4. Signals can be transmitted between the multiple game controllers 3 and the game processing unit 4 through a wired, wireless or Bluetooth device.

For example, when a multi-person game is played, each player is located at a different view area to view the screen of the multi-FOV display apparatus 2, each player performs control of the game by a game controller 3, and the game scene corresponding to each player will displayed in a different view area by the multi-FOV display apparatus 2, that is, different players can be independent of each other and do not interfere each other through different display pictures, or different players can cooperate with or combat each other in the same game environment through different display pictures. Of course, depending on different game types, the multi-FOV display apparatus 2 can also display the same game scene in different view areas, and the players can view pictures with different AOVs of the same game scene in different view areas to realize the multi-person game.

The electronic apparatus in the present embodiment can cooperate with a multi-FOV display apparatus to display multiple game pictures to realize multi-person games, so that multiple players view pictures with different game scenes through the same screen without reducing visual experience due to reduction of screen area that needs to be seen by each player.

Figure 2:
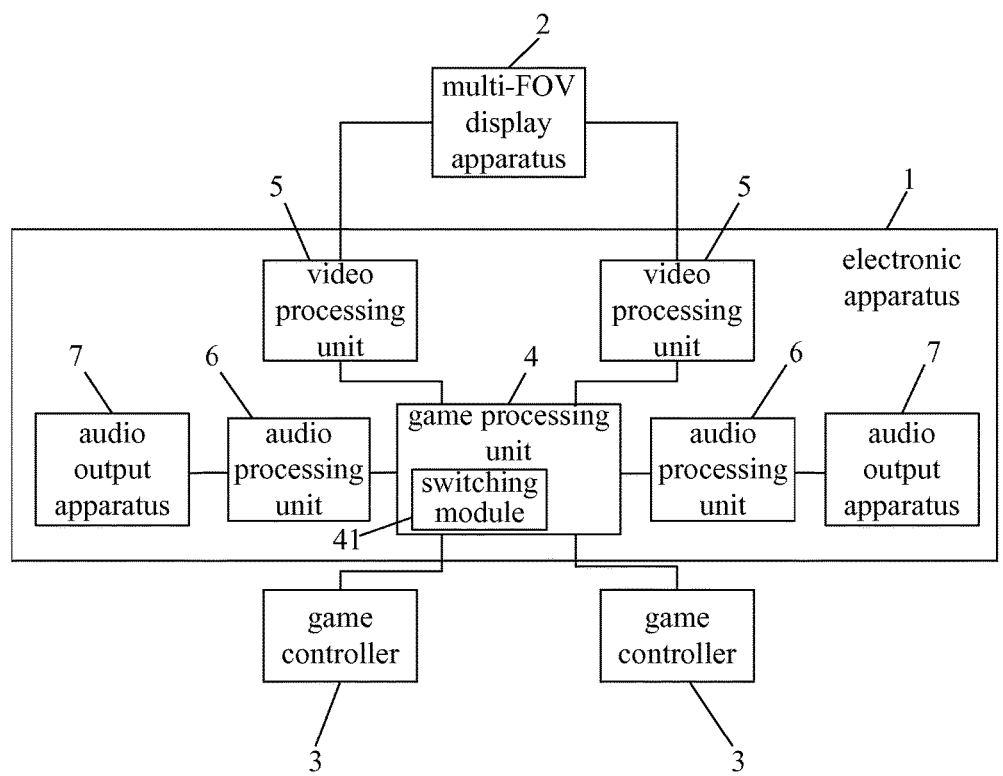
FIG. 2 is a block diagram of a structure of another electronic system in an embodiment of the present disclosure.

FIG. 2 is a block diagram of a structure of another electronic system in an embodiment of the present disclosure. Different from the electronic apparatus shown in FIG. 1, the electronic apparatus 1 shown in FIG. 2 further comprises: multiple audio processing units 6 connected to the game processing unit 4, wherein the multiple audio processing units 6 are configured to respectively receive the multiple game scene data and generate respective multiple audio signals according to the multiple game scene data; and multiple audio output apparatuses 7 respectively connected to the multiple audio processing units 6, wherein the multiple audio output apparatuses 7 are configured to respectively receive the multiple audio signals and output respective sounds according to the multiple audio signals. The game scene can be reflected by game sounds in addition to game pictures. Therefore, it is required that different players hear different sounds in different game scenes. The above audio output apparatus 7 can be a sound box, an earphone or the like.

Figure 3:
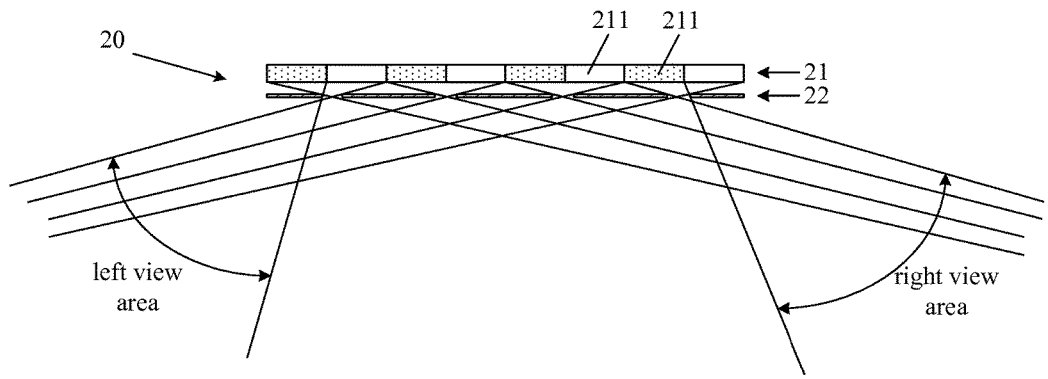
FIG. 3 is a schematic diagram of a structure of a double-field-of-view (double-FOV) apparatus in an embodiment of the present disclosure.

FIG. 3 is a schematic diagram of a structure of a double-FOV display apparatus in an embodiment of the present disclosure. For example, as shown in FIG. 3, the above multi-FOV display apparatus can be a double-FOV display apparatus 20 which has a first view area and a second view area for displaying different pictures or the same pictures. The double-FOV display apparatus 20 can also be shown with upper and lower view areas instead of left and right view areas. The upper view area and the lower view area display different pictures or the same pictures. The double-FOV display apparatus 20 comprises for example a display unit 21 and a slit grating 22 (or another prism or lens unit) on the light outputting side of the display unit 21. The slit grating 22 is an optical element in which transparent stripes and obscure stripes are arranged alternately. The slit grating 22 is used to block pixels 211 of the display unit 21 such that the display unit 21 reveals different pixels 211 in the first view area (left view area) and the second view area (right view area) respectively.

Figure 4:
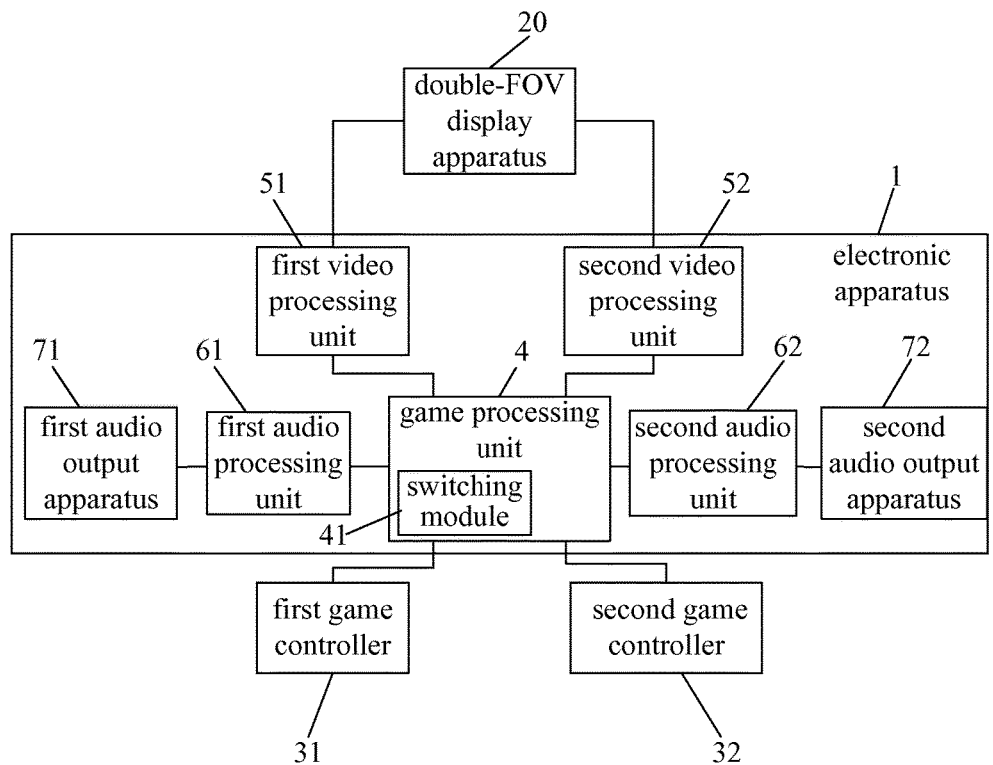
FIG. 4 is a block diagram of a structure of another electronic system in an embodiment of the present disclosure.

Description will be made in connection with FIG. 4 in the following. FIG. 4 is a block diagram of a structure of another electronic system in an embodiment of the present disclosure. As shown in FIG. 4, in the electronic apparatus 1, the multiple game controllers comprise a first game controller 31 for generating a first control signal and a second game controller 32 for generating a second control signal; the game processing unit 4 is connected to the first game controller 31 and the second game controller 32, the game processing unit 4 is configured to receive the first control signal and the second control signal and generate a first game scene data and a second game scene data according to the first control signal and the second control signal; the multiple video processing units comprise a first video processing unit 51 and a second video processing unit 52 connected to the game processing unit 4; the first video processing unit 51 is configured to receive the first game scene data and generate a first video signal according to the first game scene data; the second video processing unit 52 is configured to receive the second game scene data and generate a second video signal according to the second game scene data; in the electronic system, the first video processing unit 51 and the second video processing unit 52 are connected to the double-FOV display apparatus 20, and the first video processing unit 51 and the second video processing unit 52 are also configured to transmit the first video signal and the second video signal to the double-FOV apparatus 20 for the double-FOV apparatus 20 to display a first game picture in the first view area according to the first video signal and to display a second game picture in the second view area according to the second video signal.

In addition, the multiple audio processing units comprise a first audio processing unit 61 and a second audio processing unit 62 connected to the game processing unit 4; the first audio processing unit 61 is configured to receive the first game scene data and generate a first audio signal according to the first game scene data; the second audio processing unit 62 is configured to receive the second game scene data and generate a second audio signal according to the second game scene data; the multiple audio output apparatuses comprise a first audio output apparatus 71 connected to the first audio processing unit 61 and a second audio output apparatus 72 connected to the second audio processing unit 62; the first audio output apparatus 71 is configured to receive the first audio signal and output a first sound according to the first audio signal; and the second audio output apparatus 72 is configured to receive the second audio signal and output a second sound according to the second audio signal.

The electronic apparatus in the present embodiment can be an electronic apparatus applied to a game display apparatus, or can be an electronic apparatus applied to other display apparatus with interactive experience.

Figure 5:
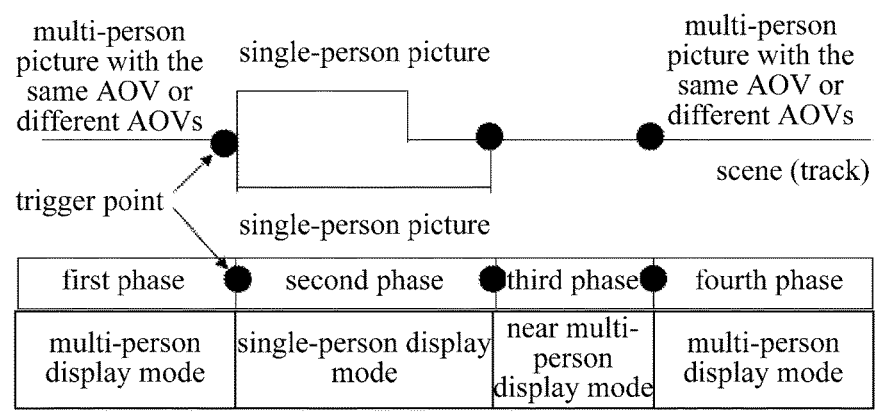
FIG. 5 is a schematic diagram of display modes of an electronic apparatus in an embodiment of the present disclosure.

FIG. 5 is a schematic diagram for a display mode of an electronic apparatus in an embodiment of the present disclosure. In the following, the principle of the electronic apparatus in the embodiment of the present disclosure is further described by taking a two-person car racing game as an example in connection with FIGS. 4 and 5. The trigger points in FIG. 5 can be regarded as trigger signals. According to the trigger points, it is possible to trigger the pictures simultaneously displayed in multiple view areas of the multi-FOV display apparatus to switch between pictures with the same AOV and pictures with different AOVs. It can be understood that, since the double-FOV display apparatus 20 can display three FOVs, it is possible to realize a three-person game. Each of the three players views a different picture through one FOV respectively (Depending on the need of the game, for example, when two or more main characters of a game stand together, they can also view the same pictures).

At the first phase on the left side of FIG. 5, a first player is located within the left view area of the double-FOV display apparatus 20, the first player controls running of a first racing car through a first game controller 31, and a first game picture displayed by pixels revealed in the left view area of the double-FOV display apparatus 20 is a picture following the AOV of the first racing car, that is, a player on the game machine side sees a picture of a first game scene (AOV viewed from left to right); a second player is located within the right view area of the double-FOV display apparatus 20, the second player controls running of a second racing car through a second game controller 32, and a second game picture displayed by pixels revealed in the right view area of the double-FOV display apparatus 20 is a picture following the AOV of the second racing car, that is, a picture of a second game scene (AOV viewed from right to left). It can be understood that the picture of the first game scene and the picture of the second game scene can also have the same AOV, that is, the double-FOV display apparatus displays exactly the same pictures in the left view area and the right area, without difference in AOV. In addition, obviously, when the double-FOV display apparatus 20 displays in upper and lower view areas (instead of left and right view areas), the picture of the first game scene shows a picture with an AOV from top to bottom, and the picture of the second game scene shows a picture with an AOV from bottom to top. Of course, even if the double-FOV display apparatus 20 displays in upper and lower view areas, the picture of the first game scene can show a picture with an AOV from left to right, and the picture of the second game scene can show a picture with an AOV from right to left. At the first phase in FIG. 5, the double-FOV display apparatus and the audio output apparatuses are all in the multi-person display mode, that is, both the left view area and the right view area of the double-AOV display apparatus display the other party, and the sound data output by the two audio output apparatuses comprise sound data of the other party.

If a three-FOV display apparatus is adopted, each of the left view area, the middle view area and the right view area displays three players, and the sound data output by each of the three audio output apparatuses comprises sound data of the three players.

Comprising sound data of another player in sound data output by one audio output apparatus refers to that the player (main player) in control of the audio output apparatus can hear sound of another player (secondary player), but this sound is not completely the same as the sound heard by the secondary player from the audio output apparatus controlled by himself (they can be the same depending on the need of the game). As for the racing car, the racing car sound of the secondary player heard by the main player feels like coming from far away, but the sound heard by the secondary player of his own racing car feels like being nearby.

In the game course of the first phase in FIG. 5, the first racing car and the second racing car are located in the same track and close to each other. The first player controls the first racing car to accelerate such that the first racing car overtakes the second racing car. During this course, the first player needs to operate the first game controller 31 to generate a signal to accelerate the first racing car (i.e., a first control signal), and after the game processing unit 4 receives the signal to accelerate the first racing car, a first game scene and a second game scene are generated such that it can be seen in both scenes that the first racing car overtakes the second racing car. Because the first game scene and the second game scene are scenes following AOVs of different racing cars respectively, the pictures that the first player and the second player see finally are not the same, that is, the first game scene data is not the same as the second game scene data. The player that can see the left view area sees that the first racing car overtakes the second racing car from the left side in the game, and the backgrounds such as trees on the right side of the second racing car are rapidly overtaken in the speed of the first racing car accordingly. The player that can see the right view area sees that the first racing car overtakes the second racing car from the left side in the game, and the backgrounds such as trees on the left side of the first racing car are overtaken slowly in the speed of the second racing car. That is, the player of the first racing car sees that the second car and the backgrounds on the right side of the second racing car move backwards based on the speed of the first racing car on the left side, and the player of the second racing car sees that the first car and the backgrounds on the left side of the first racing car move backwards based on the speed of the second racing car on the right side. The pictures of the two view areas have different AOVs.

The first game scene and the second game scene also determine different game sounds heard by the first player and the second player. For example, if the first racing car overtakes the second racing car from the left side, the first player will hear engine sound of the racing car from the right side output from the right sound channel of the earphone, and the second player will hear engine sound of the racing car from the left side output from the left sound channel of the earphone.

After the game proceeds for a period of time, multiple tracks (multiple level signals or space signals) appear for option (the most left trigger point in FIG. 5), such as undersea, valley, jungle or the like. Now, the first player chooses to control the first racing car to enter the undersea track, and the second player chooses to control the second racing car to enter the jungle track, which triggers the switching of the display mode of the game content to switch from the multi-person display mode into the single-person display mode (the second phase in FIG. 5). In the two different racing tracks, the first game scene and the second game scene are totally different, and the first player and the second player can play the game independently. The single-person display mode means that neither the left view area nor the right view area displays the other party and neither of the two audio output apparatuses has sound data of the other party.

Now, the left view area of the double-VOF display apparatus 20 displays the track (undersea track) chosen by the first player, and the content displayed in the entire left view area does not contain the second player (that is, the first player cannot see the second player, just like a single person game). At the same time, the first audio output apparatus 71 outputs the background sound (sound in the sea) of the track chosen by the first player and the sound of the first racing car, without the sound of the racing car of the second player. The right view area of the double-VOF display apparatus 20 displays the track (jungle track) chosen by the second player, and the content displayed in the entire right view area does not contain the first player (that is, the second player cannot see the first player, just like a single person game). At the same time, the second audio output apparatus 72 outputs the background sound (sound in the jungle) of the track chosen by the second player and the sound of the second racing car, without the sound of the racing car of the first player.

With the proceeding of the game, when reaching the second trigger point (the middle trigger point in FIG. 5), the first racing car comes to a convergence track (e.g., a beach track) from the undersea track, but the second racing car is still in the jungle track now; therefore, the first player and the second player still cannot see each other's car. It is also possible that the second racing car comes to the convergence track (i.e., the above beach track) from the jungle track, but the second racing car still does not catch the first racing car due to its speed. Therefore, the display contents seen by the two players still do not contain each other's racing car; however, the sound output from the first audio apparatus 71 already has the sound of the second racing car and the sound output from the second audio apparatus 72 already has the sound of the first racing car, to reflect that the two racing cars are close to each other. This is the third phase in FIG. 5. The double-FOV display apparatus and the audio output apparatuses are all in the near multi-person display mode, that is, at least one of the left view area and the right view area does not display the other party (the other party can or cannot be seen from the other view area), but the sound output by at least one of the two audio output apparatuses has sound data of the other party.

If a three-FOV display apparatus is adopted, at least one view area does not display the other two players (only displays the player controlling this view area), but the sound data output by at least one audio output apparatus comprises sound data of the other players.

After the game proceeds for a period of time, the second racing car and the second racing car converges again (i.e., the trigger point on the most right side in FIG. 5), entering the fourth phase in FIG. 5 now. The first player and the second player can choose to race in the same track again, returning back to the multi-person display mode, that is, the pictures seen by the two players are pictures with the two racing cars displayed with the same AOV or different AOVs. The display and sound processing in this phase are similar to those in the first phase, details omitted.

In the foregoing description, the game principle is described in detail only by taking the example of a two-person game performed in a double-FOV display apparatus; however, it can be understood that it may also be applied to a three-person game performed in a three-FOV display apparatus.

Although two players see different display pictures in the above embodiments, the first game scene data and the second game scene data can also be the same due to reasons (this is also a kind of trigger signal) such as simplification of data, game content requirement (for example, the hero and the heroine are hugging to see the stars in the game) or the like. As such, the first game scene and the second game scene display pictures with the same AOV, that is, the two players see exactly the same pictures.

It is noted that the first phase to the fourth phase in the above embodiment are switched sequentially, but alternatively, the first phase to the fourth phase can be switched in an arbitrary order, or switching can only be performed between any two of them.

It is noted that only triggers due to tracks (such as signals of track distance, track level, tack space or the like) are mentioned in the above embodiment, but it is also possible that the players operate the game controllers in their hand to perform trigger to switch from the multi-person display mode to the single-person display mode or from the single-person display mode to the multi-person display mode. For example, the switching function can be performed directly through a certain button on the game controller 3, that is, triggering by a force signal.

The electronic apparatus in the present embodiment can cooperate with a multi-FOV display apparatus to display multiple game pictures to realize multi-person games, such that multiple players view pictures with different game scenes through the same screen without reducing visual experience due to reduction of screen area that needs to be seen by each player.

An embodiment of the present disclosure provides an electronic system comprising a multi-FOV display apparatus and an electronic apparatus described in the above embodiment. The electronic apparatus is connected to the multi-FOV display apparatus.

Further, for integration and reducing usage space, the electronic apparatus and the multi-FOV display apparatus can be integrated together.

For example, an embodiment of the present disclosure provides an electronic system as shown in FIG. 1 comprising an electronic apparatus 1 described in the above embodiments and a multi-FOV display apparatus 2 connected to the electronic apparatus 1. The multi-FOV display apparatus 2 has multiple view areas each of which covers the entire display area of the multi-FOV display apparatus and displays one picture respectively, and the electronic apparatus controls the multi-FOV display apparatus such that at least two pictures among the pictures simultaneously displayed in the view areas are based on different AOVs.

Further, the AOVs of the pictures can be AOVs of different avatars in a game.

Further, the pictures simultaneously displayed in the view areas are switched between pictures with the same AOV and pictures with different AOVs according to display needs of content.

Further, as shown in FIG. 1, the electronic apparatus 1 can comprise a game processing unit 4 and multiple video processing units 5. The game processing unit 4 comprises a switching module 41 for switching the pictures simultaneously displayed in the multiple view areas of the multi-FOV display apparatus between the pictures with the same AOV and the pictures with different AOVs according to display needs of content. For example, the switching module 41 can perform switching between the pictures with the same AOV and the pictures with different AOVs according to a trigger signal such as a level signal, a distance signal, a space signal or a force signal. The game processing unit 4 is also configured to receive multiple control signals and generate multiple game scene data according to the multiple control signals. The multiple video processing units 5 are connected to the game processing unit 4, and the multiple video processing units 5 are configured to receive the multiple game scene data respectively and generate respective multiple video signals according to the multiple game scene data. The multi-FOV display apparatus 2 is connected to the multiple video processing units 5, and the multi-FOV display apparatus 2 is configured to receive multiple video signals and display respective pictures in the multiple view areas respectively according to the multiple video signals.

For example, the electronic system can integrally arrange the above electronic apparatus 1 and the multi-FOV display apparatus 2, which can further improve the integration of the devices and thus save space. Alternatively, the above electronic apparatus 1 and the multi-FOV display apparatus 2 are independent of each other. Only when it is needed to perform a game, the electronic apparatus 1 is connected to the multi-FOV display apparatus 2, which is advantageous in use convenience and selection freedom. The principle and operation procedure of the electronic apparatus and the multi-FOV display apparatus are the same as those in the above embodiment, details omitted.

Further, the electronic apparatus can further comprise multiple game controllers 3 for respectively generating multiple control signals to be transmitted to the game processing unit 4 to provide the control signals needed by the game processing unit 4.

Further, in order to facilitate the operation of the players, in case that the electronic system integrally arrange the above electronic apparatus 1 and the multi-FOV display apparatus 2, it is possible that the multiple game controllers in the electronic apparatus 1 are separated and made in the form of joystick, keyboard, mouse, touch sensor, gravity sensor, body-sensing controller or Bluetooth device. Signal transmission is performed between the game controller 3 and the game processing unit 4 through a wired, wireless or Bluetooth device.

The electronic system in the present embodiment can cooperate with a multi-FOV display apparatus to display multiple game pictures to realize multi-person games, such that multiple players view pictures with different game scenes through the same screen without reducing visual experience due to reduction of screen area that needs to be seen by each player.

For example, as shown in FIG. 2, the electronic apparatus 1 in the electronic system further comprises: multiple audio processing units 6 connected to the game processing unit 4, wherein the multiple audio processing units 6 are configured to respectively receive the multiple game scene data and generate respective multiple audio signals according to the multiple game scene data; and multiple audio output apparatuses 7 respectively connected to the multiple audio processing units 6, wherein the multiple audio output apparatuses 7 are configured to respectively receive the multiple audio signals and output respective sounds according to the multiple audio signals.

For example, as shown in FIG. 3, the multi-FOV display apparatus in the above electronic system can be a double-FOV display apparatus 20 which has a first view area (left view area) and a second view area (right view area) for displaying different pictures. However, the first view area (left view area) and the second view area (right view area) can also display the same pictures.

The electronic system comprising the above double-FOV display apparatus 20 and the electronic apparatus 1 is as shown in FIG. 4. In the electronic apparatus 1, the multiple game controllers comprise a first game controller 31 for generating a first control signal and a second game controller 32 for generating a second control signal; the game processing unit 4 is connected to the first game controller 31 and the second game controller 32, the game processing unit 4 is configured to receive the first control signal and the second control signal and generate a first game scene data and a second game scene data according to the first control signal and the second control signal; the multiple video processing units comprise a first video processing unit 51 and a second video processing unit 52 connected to the game processing unit 4; the first video processing unit 51 is configured to receive the first game scene data and generate a first video signal according to the first game scene data; the second video processing unit 52 is configured to receive the second game scene data and generate a second video signal according to the second game scene data; the double-FOV display apparatus 20 is connected to the first video processing unit 51 and the second video processing unit 52; the double-FOV display apparatus 20 is configured to receive the first video signal and display a first game picture in the first view area according to the first video signal; the double-FOV display apparatus 20 is also configured to receive the second video signal and display a second game picture in the second view area according to the second video signal.

For example, the multiple audio processing units comprise a first audio processing unit 61 and a second audio processing unit 62 connected to the game processing unit 4; the first audio processing unit 61 is configured to receive the first game scene data and generate a first audio signal according to the first game scene data; the second audio processing unit 62 is configured to receive the second game scene data and generate a second audio signal according to the second game scene data; the multiple audio output apparatus comprise a first audio output apparatus 71 connected to the first audio processing unit 61 and a second audio output apparatus 72 connected to the second audio processing unit 62; the first audio output apparatus 71 is configured to receive the first audio signal and output a first sound according to the first audio signal; and the second audio output apparatus 72 is configured to receive the second audio signal and output a second sound according to the second audio signal.

The principle and the operating procedure of the electronic apparatus and the multi-FOV display apparatus are the same as those in the above embodiments, details omitted.

The electronic system in the present embodiment can cooperate with a multi-FOV display apparatus to display multiple game pictures to realize multi-person games, such that multiple players view pictures with different game scenes through the same screen without reducing visual experience due to reduction of screen area that needs to be seen by each player.

An embodiment of the present disclosure provides a control method for controlling a multi-FOV display apparatus, wherein the multi-FOV display apparatus has multiple view areas each of which covers the entire display area of the multi-FOV display apparatus and displays one picture respectively, and the control method is for controlling to make at least two pictures among the pictures simultaneously displayed in the multiple view areas of the multi-FOV display apparatus be based on different AOVs. Each view area of the above multi-FOV display apparatus displays one corresponding picture, at the same timing, those pictures can be based on the same AOV or based on different AOVs, as long as at least two pictures are controlled to be based on different AOVs at a certain timing.

Further, each view area of the above multi-FOV display apparatus displays one corresponding picture, and the AOVs of the pictures are AOVs of different avatars in the game, or can be an AOV of a set third person.

Further, the pictures simultaneously displayed in the view areas are controlled to switch between pictures with the same AOV and pictures with different AOVs according to display needs of content.

Further, the switching between the pictures with the same AOV and the pictures with different AOVs can be performed according to display needs of content, for example, according to a trigger signal such as a level signal, a distance signal, a space signal or a force signal. Taking the distance signal as an example, when different avatars in the game are very close in distance, the AOV can be switched into a third person AOV to display the main character avatar and other avatars simultaneously. Such multi-person display mode makes multiple players see the same picture. When the distance between different avatars in the game is beyond a certain distance, the AOV of the picture displayed in one view area is a first person or second person AOV of a avatar of a main character, and the AOV of the picture displayed in another view area is a first person or second person AOV of a avatar of a secondary character.

Similarly, the level signal or the space signal can also be the trigger signal. The force signal can also be the trigger signal. When one of the multiple players does not want to play in the picture with its own AOV, he can click a specific button or use a specific equipment to trigger to force into the picture with the same AOV, that is, switch into a picture with a third person AOV to display the main character avatar and other avatars. On the contrary, if he does not want to play in the picture with the same AOV, he can also click a specific button or use a specific equipment to trigger to force into the picture with different AOVs.

Figure 6:
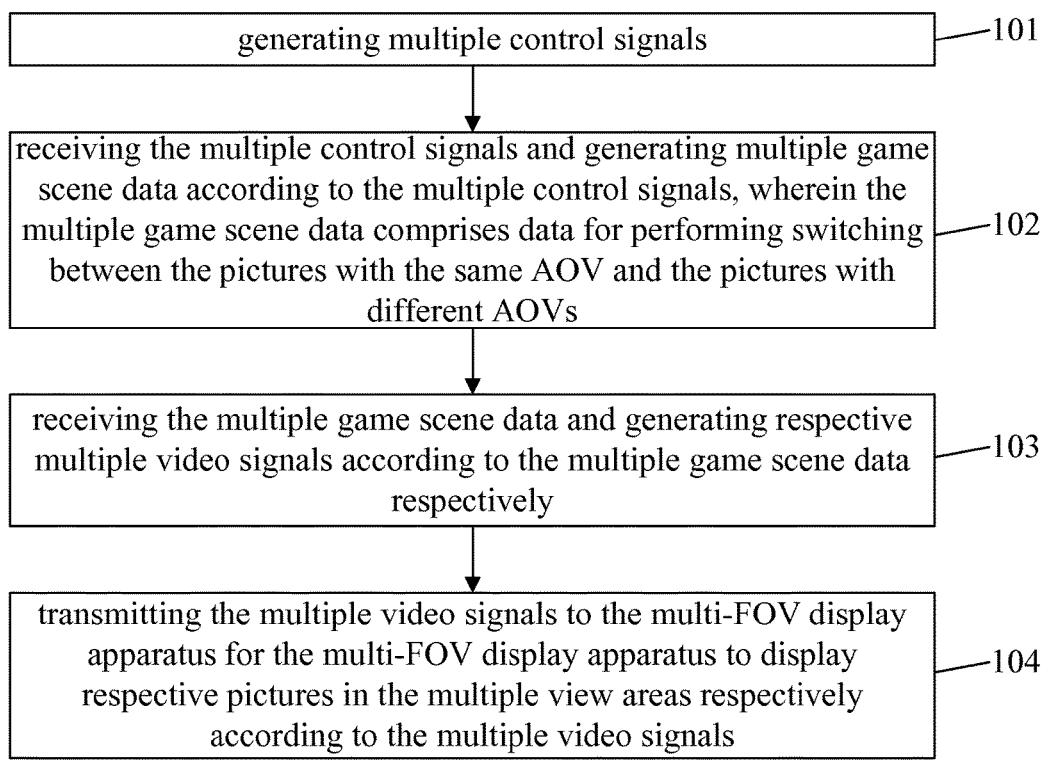
FIG. 6 is a flowchart of a control method in an embodiment of the present disclosure.

FIG. 6 is a flowchart of a control method in an embodiment of the present disclosure. As shown in FIG. 6, the control method comprises:

a step 101 of generating multiple control signals;

a step 102 of receiving the multiple control signals and generating multiple game scene data according to the multiple control signals, wherein the multiple game scene data comprises data for performing switching between the pictures with the same AOV and the pictures with different AOVs;

a step 103 of receiving the multiple game scene data and generating respective multiple video signals according to the multiple game scene data respectively; and a step 104 of transmitting the multiple video signals to the multi-FOV display apparatus for the multi-FOV display apparatus to display respective pictures in the multiple view areas respectively according to the multiple video signals.

Further, the step 101 generates multiple control signals which can comprise a trigger signal.

The control method can be applied to the electronic apparatus in the above embodiment. The principle and the operation procedure can be the same as those in the above embodiments, details omitted.

The control method in the present embodiment can cooperate with a multi-FOV display apparatus to display multiple game pictures to realize multi-person games, such that multiple players view pictures with different game scenes through the same screen without reducing visual experience due to reduction of screen area that needs to be seen by each player.

For example, the multi-FOV display apparatus is a double-FOV display apparatus which has a first view area and a second view area for displaying different pictures.

In the above step 101, for example, generating multiple control signals is generating a first control signal and generating a second control signal.

In the above step 102, for example, the procedure of receiving the multiple control signals and generating multiple game scene data according to the multiple control signals is: receiving the first control signal and the second control signal and generating a first game scene data and a second game scene data according to the first control signal and the second control signal.

In the above step 103, for example, the procedure of receiving the multiple game scene data and generating respective multiple video signals according to the multiple game scene data respectively is: receiving the first game scene data and generating a first video signal according to the first game scene data, and receiving the second game scene data and generating a second video signal according to the second game scene data.

In the above step 104, for example, the procedure of transmitting the multiple video signals to the multi-FOV display apparatus for the multi-FOV display apparatus to display respective pictures in the multiple view areas respectively according to the multiple video signals is: transmitting the first video signal and the second video signal to the double-FOV apparatus for the double-FOV apparatus to display a first game picture in the first view area according to the first video signal and to display a second game picture in the second view area according to the second video signal.

The principle and the operation procedure of the method can be the same as those in the above embodiments, details omitted.

The control method in the present embodiment can cooperate with a multi-FOV display apparatus to display multiple game pictures to realize multi-person games, such that multiple players view pictures with different game scenes through the same screen without reducing visual experience due to reduction of screen area that needs to be seen by each player.

With the description of the above embodiments, those skilled in the art can clearly understand that the present disclosure can be implemented by software with necessary commonly-used hardware, or can be implemented by hardware. However, in most cases, the former way is preferred.

The above descriptions are only specific implementations of the present disclosure, and the protection scope of the present disclosure is not limited to that. Those skilled in the art can conceive of variations and replacements within the technical scope of the present disclosure. These variations and replacements are also intended to be incorporated within the protection scope of the present disclosure. Therefore, the protection scope of the present disclosure is defined by the protection scope of the claims.

The present application claims the priority of Chinese Patent Application No. 201410366555.8 filed on Jul. 29, 2014, entire content of which is incorporated as part of the present invention by reference.

What is claimed is:

1. An electronic apparatus for controlling a multi-field-of-view (multi-FOV) display apparatus, wherein the multi-FOV display apparatus has multiple view areas, each of which covers the entire display area of the multi-FOV display apparatus and displays one picture respectively, and the electronic apparatus controls the multi-FOV display apparatus such that at least two pictures among pictures simultaneously displayed in the view areas are based on different angles of view (AOVs), wherein the electronic apparatus comprises a game processing unit and multiple video processing units, and the game processing unit comprising a switching module for performing switching between pictures with the same AOV and pictures with different AOVs;

the game processing unit is also configured to receive multiple control signals and generate multiple game scene data according to the multiple control signals;

the multiple video processing units are connected to the game processing unit, and the multiple video processing units are configured to receive the multiple game scene data respectively and generate respective multiple video signals according to the multiple game scene data; and the multiple video processing units are configured to transmit the multiple video signals to the multi-FOV display apparatus for the multi-FOV display apparatus to display respective pictures in the multiple view areas respectively according to the multiple video signals, wherein the pictures simultaneously displayed in the view areas are automatically switched between pictures with the same AOV and pictures with different AOVs according to a trigger signal in a scene of a game.

2. The electronic apparatus according to claim 1, wherein the different AOVs are AOVs of different avatars in the game.

3. The electronic apparatus according to claim 1, wherein the pictures simultaneously displayed in the view areas are switched between the pictures with the same AOV and the pictures with different AOVs according to display needs of content.

4. The electronic apparatus according to claim 3, wherein the trigger signal is based on the display needs of content.

5. The electronic apparatus according to claim 1, wherein the trigger signal comprises a level signal, a distance signal, a space signal or a force signal.

6. The electronic apparatus according to claim 1, wherein at least one control signal of the multiple control signals comprises a second trigger signal, wherein the pictures simultaneously displayed in the view areas are switched between pictures with the same AOV and pictures with different AOVs according to the second trigger signal.

7. The electronic apparatus according to claim 1, wherein the electronic apparatus further comprises multiple game controllers for respectively generating multiple control signals to be transmitted to the game processing unit.

8. The electronic apparatus according to claim 1, further comprising:

multiple audio processing units connected to the game processing unit, wherein the multiple audio processing units are configured to respectively receive the multiple game scene data and generate respective multiple audio signals according to the multiple game scene data; and multiple audio output apparatuses respectively connected to the multiple audio processing units, wherein the multiple audio output apparatuses are configured to respectively receive the multiple audio signals and output respective sounds according to the multiple audio signals.

9. The electronic apparatus according to claim 7, wherein the multi-FOV display apparatus is a double-field-of-view (double-FOV) display apparatus which has a first view area and a second view area for displaying different pictures;

the multiple game controllers comprise a first game controller for generating a first control signal and a second game controller for generating a second control signal;

the game processing unit is connected to the first game controller and the second game controller, the game processing unit is configured to receive the first control signal and the second control signal and generate first game scene data and second game scene data according to the first control signal and the second control signal;

the multiple video processing units comprise a first video processing unit and a second video processing unit connected to the game processing unit;

the first video processing unit is configured to receive the first game scene data and generate a first video signal according to the first game scene data;

the second video processing unit is configured to receive the second game scene data and generate a second video signal according to the second game scene data; and the first video processing unit and the second video processing unit are also configured to transmit the first video signal and the second video signal to the double-FOV apparatus for the double-FOV apparatus to display a first game picture in the first view area according to the first video signal and to display a second game picture in the second view area according to the second video signal.

10. The electronic apparatus according to claim 9, further comprising:

a first audio processing unit and a second audio processing unit connected to the game processing unit, and a first audio output apparatus connected to the first audio processing unit and a second audio output apparatus connected to the second audio processing unit;

the first audio processing unit is configured to receive the first game scene data and generate a first audio signal according to the first game scene data;

the second audio processing unit is configured to receive the second game scene data and generate a second audio signal according to the second game scene data;

the first audio output apparatus is configured to receive the first audio signal and output a first sound according to the first audio signal; and the second audio output apparatus is configured to receive the second audio signal and output a second sound according to the second audio signal.

11. An electronic system comprising a multi-FOV display apparatus and the electronic apparatus according to claim 1, wherein the electronic apparatus is connected to the multi-FOV display apparatus.

12. The electronic system according to claim 11, wherein the electronic apparatus and the multi-FOV display apparatus are integrated together.

13. A control method for controlling a multi-FOV display apparatus, wherein the multi-FOV display apparatus has multiple view areas, each of which covers the entire display area of the multi-FOV display apparatus and displays one picture respectively, and the control method comprises:

making at least two pictures among pictures simultaneously displayed in the view areas be based on different angles of view (AOVs);

generating multiple control signals;

receiving the multiple control signals and generating multiple game scene data according to the multiple control signals, wherein the multiple game scene data comprises data for performing switching between pictures with the same AOV and pictures with different AOVs;

receiving the multiple game scene data and generating respective multiple video signals according to the multiple game scene data; and transmitting the multiple video signals to the multi-FOV display apparatus for the multi-FOV display apparatus to display respective pictures in the multiple view areas respectively according to the multiple video signals, wherein the pictures simultaneously displayed in the view areas are automatically switched between pictures with the same AOV and pictures with different AOVs according to a trigger signal in a scene of a game.

14. The control method according to claim 13, wherein the different AOVs are AOVs of different avatars in the game.

15. The control method according to claim 13, wherein the pictures simultaneously displayed in the view areas are switched between the pictures with the same AOV and the pictures with different AOVs according to display needs of content.

16. The control method according to claim 13, wherein the multi-FOV display apparatus is a double-FOV display apparatus which has a first view area and a second view area for displaying different pictures;

wherein the generating multiple control signals comprises generating a first control signal and generating a second control signal;

wherein the receiving the multiple control signals and generating multiple game scene data according to the multiple control signals comprises receiving the first control signal and the second control signal and generating a first game scene data and a second game scene data according to the first control signal and the second control signal;

wherein the receiving the multiple game scene data and generating respective multiple video signals respectively according to the multiple game scene data comprises receiving the first game scene data and generating a first video signal according to the first game scene data, and receiving the second game scene data and generating a second video signal according to the second game scene data; and wherein the transmitting the multiple video signals to the multi-FOV display apparatus for the multi-FOV display apparatus to display respective pictures in the multiple view areas respectively according to the multiple video signals comprises transmitting the first video signal and the second video signal to the double-FOV apparatus for the double-FOV apparatus to display a first game picture in the first view area according to the first video signal and to display a second game picture in the second view area according to the second video signal.

17. The electronic apparatus according to claim 2, wherein the pictures simultaneously displayed in the view areas are switched between the pictures with the same AOV and the pictures with different AOVs according to display needs of content.

18. The electronic apparatus according to claim 17, wherein trigger signal is based on the display needs of content.

* * * * *